Sept. 9, 1930.  G. T. THURNEYSSEN  1,775,218
JOINT AND CONNECTION
Filed March 5, 1925

INVENTOR
GUY T. THURNEYSSEN
BY
ATTORNEY

Patented Sept. 9, 1930

1,775,218

UNITED STATES PATENT OFFICE

GUY THÉODORE THURNEYSSEN, OF PARIS, FRANCE

JOINT AND CONNECTION

Application filed March 5, 1925, Serial No. 13,418, and in France April 10, 1924.

This invention relates to joints between materials having different coefficients of expansion and particularly to joints between metallic and glass members subject to wide temperature variations. The invention also relates to methods of making such joints.

One of the principal objects of the invention is the provision of a joint or connection between materials possessing different coefficients of expansion, having; (1) reliability; (2) safety of damage to the various materials during changes of temperature; (3) ruggedness; and (4) airtightness. Another principal object of the invention is the provision of an inexpensive method of making such joints or connections.

Figure 1:
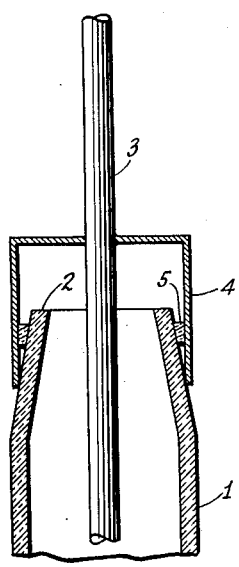
Figure 2:
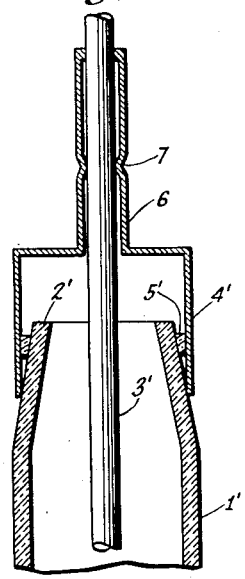
Figure 3:
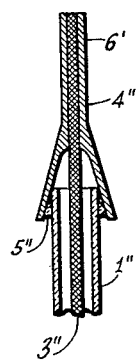

Other objects and advantages of the invention will be apparent from the following description taken in connection with the accompanying drawings, in which Fig. 1 is a view partly in section and partly in elevation of a preferred modification of the invention, Fig. 2 is a similar view of another modification, Fig. 3 is a similar view of still another modification.

Referring to Fig. 1, the joint or connection comprises a tube 1 terminating at one of its ends in an inwardly projecting hollow conical portion 2, an electrical conducting member 3, a cap member 4 and an annular securing member 5.

The tube 1 is preferably made of glass while the cap member 4 is constructed out of some suitable metal such as copper. The exterior walls of the conical portion 2 are enameled by the successive application in a heated state of a mordant or caustic and immediately thereafter by an enamel possessing an appropriate coefficient of expansion. The annular securing member 5, which is preferably made of glass, is now slipped over the external periphery of the conical portion 2. The relative configuration and sizes of the members 2 and 5 are such that the annular member 5 will just slip over the end of the conical portion 2 when the entire assembly possesses a comparatively low temperature.

The depending cylindrical portion of the cap 4 is now slipped over the annular securing member 5, the conductor 3 passing through the tube 1 as shown. The conical portion 2 is now heated and pressure is applied to unite the conical portion to the annular glass member 5. The fusible glass, of which the annular member is constructed, softens during the application of heat. This results in the downward movement of the cap member 4 and the annular member 5 along the conical portion 2. The softening of the fusible glass of the annular member effects an intimate adherence and connection with the enamel. This results in a hermetical joint between the metal and glass.

The cap member 4 is secured to the conductor 3 as shown, by welding, soldering, brazing or by any other suitable method.

Referring to Fig. 2, the cap member 4' has an upwardly extending tubular extension 6 through which the conductor 3' extends as shown. The cap member 4' is secured to the tube 1' in the same manner as explained above in connection with members 1 and 4 in Fig. 1. The conductor 3' is secured in the upper end of the extension 6 by soldering, welding, brazing or any other suitable method.

This arrangement possesses the following advantages:

(1) Permits the mounting of conductor 3' and the electrodes which may be attached thereto in the interior of the closed vessel or container communicating with the tube 1' regardless of and independent of the making of the joint or connection between the cap member 4' and the tube 1';

(2) Permits of the conductor being made of a highly conducting metal regardless of the coefficient of expansion of the same. (In fact the metal employed may have a higher coefficient than glass; while the cap member may be made of ferro-chrome or any other suitable material capable of effecting a very tight joint with the glass).

The conductor 3' may be positioned in the tubular extension 6 by means of the constricted portion 7 embodied in the tubular construction.

Referring to Fig. 3, the conductor 3" is passed through the tubular extension of the cap member 4" and is suitably secured therein by soldering, welding, brazing or any other suitable method. The lower conical portion of the cap member 4" is secured to the tube 1" in a manner similar to the method employed in securing the members 1 and 4 together as explained above in connection with Fig. 1. In this modification the tube 1" is straight instead of terminating in a conical portion.

While I have shown and described various preferred modifications of my invention, I do not limit myself to the same; but may employ such other modifications as come within the spirit and scope of my invention.

What I claim is:

1. A hermetic seal between a lead-in conductor and a glass tube, comprising a lead-in conductor, a glass tube, a fusible glass ring fitted over the end of said glass tube, and a metallic cap enclosing said end firmly secured to said glass ring by the application of heat and pressure, said metallic cap having the lead-in conductor welded thereto to extend centrally within the glass tube.

2. In combination, a glass vessel provided with a tapered end portion, a fusible glass ring fitted over said end portion, a metallic cap firmly secured to said fusible glass ring by the application of heat and pressure, and a lead-in conductor welded to the metallic cap and disposed centrally within the glass vessel, whereby a hermetic seal between vessel and lead-in conductor is produced.

3. The method of producing a hermetic seal between a glass vessel and a lead-in conductor, said conductor being welded to a metallic closure for said vessel, which consists in reducing the diameter of the open end of the vessel, coating the outer surface of the reduced portion with a fusible enamel, placing a fusible glass ring around the reduced portion, fitting the metallic closure over the fusible glass ring, then heating the reduced portion and applying pressure to the metallic closure to effect an intimate adherence between closure and reduced portion.

4. In combination, a glass vessel provided with a tapered end portion, a fusible glass ring fitted over said end portion, and a metallic cap firmly secured to said fusible glass ring by the application of heat and pressure, whereby a hermetic seal is formed between the glass vessel and the metallic cap.

5. The method of producing a hermetic seal between a glass vessel and a metallic member, which comprises tapering one of said members to make it fit within the other, coating the outer surface of the inner member with a fusible enamel, placing a fusible glass ring around the enameled surface, fitting the outer member over the fusible glass ring, heating the inner and outer members, and applying pressure to effect an intimate adherence between both members.

GUY THÉODORE THURNEYSSEN.